United States Patent
Gupta et al.

(10) Patent No.: US 12,189,573 B2
(45) Date of Patent: Jan. 7, 2025

(54) TECHNIQUE FOR CREATING AN IN-MEMORY COMPACT STATE OF SNAPSHOT METADATA

(71) Applicant: Nutanix, Inc., San Jose, CA (US)

(72) Inventors: Abhishek Gupta, Ghaziabad (IN); Freddy James, Maharastra (IN); Pranab Patnaik, Cary, NC (US); Ranjan Mn, Karnataka (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/376,822

(22) Filed: Jul. 15, 2021

(65) Prior Publication Data

US 2022/0358087 A1    Nov. 10, 2022

(30) Foreign Application Priority Data

May 8, 2021   (IN) .............................. 202141020922

(51) Int. Cl.
   *G06F 16/11*   (2019.01)
   *G06F 16/16*   (2019.01)
(52) U.S. Cl.
   CPC .......... *G06F 16/128* (2019.01); *G06F 16/164* (2019.01)
(58) Field of Classification Search
   CPC ........................... G06F 16/128; G06F 16/164
   See application file for complete search history.

(56) References Cited

U.S. PATENT DOCUMENTS 8,549,518 B1   10/2013   Aron et al.
8,601,473 B1   12/2013   Aron et al.
(Continued)

FOREIGN PATENT DOCUMENTS

WO   WO-2010033962   *   3/2010   ............. G06F 17/00
WO   WO-2012013509 A1 *  7/2011   ............. G06F 11/36

OTHER PUBLICATIONS

Cano, Ignacio, "Curator: Self-Managing Storage for Enterprise Clusters" University of Washington; published Mar. 2017; pp. all.
(Continued)

*Primary Examiner* — Hosain T Alam
*Assistant Examiner* — Chongsuh Park
(74) *Attorney, Agent, or Firm* — Cesari and McKenna, LLP

(57) ABSTRACT

A technique creates a compact state of snapshot metadata and associated selected snapshots that are frequently used and maintained in memory of a node of a cluster to facilitate processing of workflow operations associated with a logical entity in a disaster recovery (DR) environment. The compact state represents a minimal subset of snapshot metadata that is frequently used to perform operations in accordance with the DR workflow operations. In addition, metadata associated with the progress of the DR workflow operations processed by the node is periodically consolidated within the compact state. Illustratively, the selected frequently used snapshots of the logical entity include (i) a recently created snapshot; (ii) one or more reference snapshots; (iii) a snapshot scheduled for replication; and (iv) any snapshot that is queued for a current or future-scheduled operation. The technique is also directed to a snapshot and metadata eviction policy that is configured to evict infrequently used snapshots and snapshot metadata to improve memory space consumption of the memory.

30 Claims, 5 Drawing Sheets

(56) References Cited

U.S. PATENT DOCUMENTS

| | | |
|---|---|---|
| 8,850,130 B1 | 9/2014 | Aron et al. |
| 8,863,124 B1 | 10/2014 | Aron et al. |
| 9,009,106 B1 | 4/2015 | Aron et al. |
| 9,069,708 B2 | 6/2015 | Gill et al. |
| 9,336,132 B1 | 5/2016 | Aron et al. |
| 9,652,265 B1 | 5/2017 | Narayanasamy et al. |
| 9,747,287 B1 | 8/2017 | Bhardwaj et al. |
| 9,772,866 B1 | 9/2017 | Aron et al. |
| 10,339,131 B1 * | 7/2019 | Dolas .................... G06F 16/182 |
| 11,586,391 B2 | 2/2023 | Tatiparthi et al. |
| 11,614,879 B2 | 3/2023 | Kataria et al. |
| 2017/0075965 A1 * | 3/2017 | Liu ..................... G06F 16/2386 |
| 2018/0121454 A1 * | 5/2018 | Kushwah ............... H04L 67/568 |
| 2020/0089573 A1 * | 3/2020 | Baggerman ......... G06F 11/1464 |
| 2020/0174692 A1 * | 6/2020 | Dave .................... G06F 16/185 |
| 2020/0311025 A1 * | 10/2020 | Singh .................. G06F 11/1004 |
| 2022/0253243 A1 | 8/2022 | Kataria et al. |
| 2022/0318264 A1 * | 10/2022 | Jain .................... G06F 11/2094 |

OTHER PUBLICATIONS

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 17, 2019 pp. all.

Citrix XenDesktop 7.1 on Microsoft Hyper-V Server 2012 R2 on Nutanix Virtual Computing Platform Solution Design Citrix Validated Solutions, Jun. 25, 2014, 95 pages.

* cited by examiner

TECHNIQUE FOR CREATING AN IN-MEMORY COMPACT STATE OF SNAPSHOT METADATA

CROSS-REFERENCE TO RELATED APPLICATIONS

The present application claims the benefit of India Provisional Patent Application Serial No. 202141020922, which was filed on May 8, 2021, by Abhishek Gupta, et al. for TECHNIQUE FOR CREATING AN IN-MEMORY COMPACT STATE OF SNAPSHOT METADATA, which is hereby incorporated by reference.

BACKGROUND

Technical Field

The present disclosure relates to snapshots and, more specifically, to use of snapshots and snapshot metadata to facilitate processing of workflow operations in a disaster recovery (DR) environment.

Background Information

Data failover generally involves copying or replicating data of workloads among one or more nodes of clusters embodied as, e.g., datacenters to enable continued operation of data processing operations in a multi-site data replication environment, such as disaster recovery (DR). Such data replication may involve a large number of point-in-time images or "snapshots" of workloads that include data of the snapshot (e.g., a virtual disk exported to the VM) as well as snapshot metadata. However, not all snapshots and snapshot metadata may be needed for all snapshot operations as many snapshots are created to support arbitrary roll-back, which is rarely used. Yet, all of the snapshot metadata associated with each snapshot is typically maintained in memory even if some of the snapshots and metadata are infrequently used. Maintenance of infrequently used snapshots and snapshot metadata needlessly increases consumption of resources such as memory (i.e., memory footprint).

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a technique for creating a compact state of snapshot metadata and associated selected snapshots that are frequently used (or expected to be frequently used) and thus maintained in memory of a node of a cluster to facilitate processing of workflow operations associated with a logical entity, such as a virtual machine, in a disaster recovery (DR) environment. The compact state represents a reduced (e.g., minimal) subset of snapshot metadata in accordance with actual or expected performance of operations, such as frequently used DR workflow operations. In addition, metadata associated with the progress of the DR workflow operations processed by the node is periodically consolidated within the compact state. Illustratively, the selected, frequently-used snapshots of the logical entity (usually associated with DR of the logical entity) include (i) a recently created (latest) snapshot; (ii) one or more reference snapshots; (iii) a snapshot scheduled for replication; and (iv) any snapshot that is queued for a current or future-scheduled operation.

The technique is also directed to a snapshot and metadata eviction policy that is configured to evict infrequently used snapshots and snapshot metadata to improve memory space consumption of the memory (i.e., the memory footprint). Eviction rules of the eviction policy are applied to the snapshots of the logical entity to ensure that the selected snapshots are not evicted from (i.e., are retained in) memory. In essence, the eviction policy retains snapshots essential for expected near-term use (e.g., based on a time threshold) and for DR operations (e.g., snapshot replication to other sites). As such, the eviction policy is application aware (e.g., DR workflow processing) and predictive of application object use.

DESCRIPTION

Figure 1:
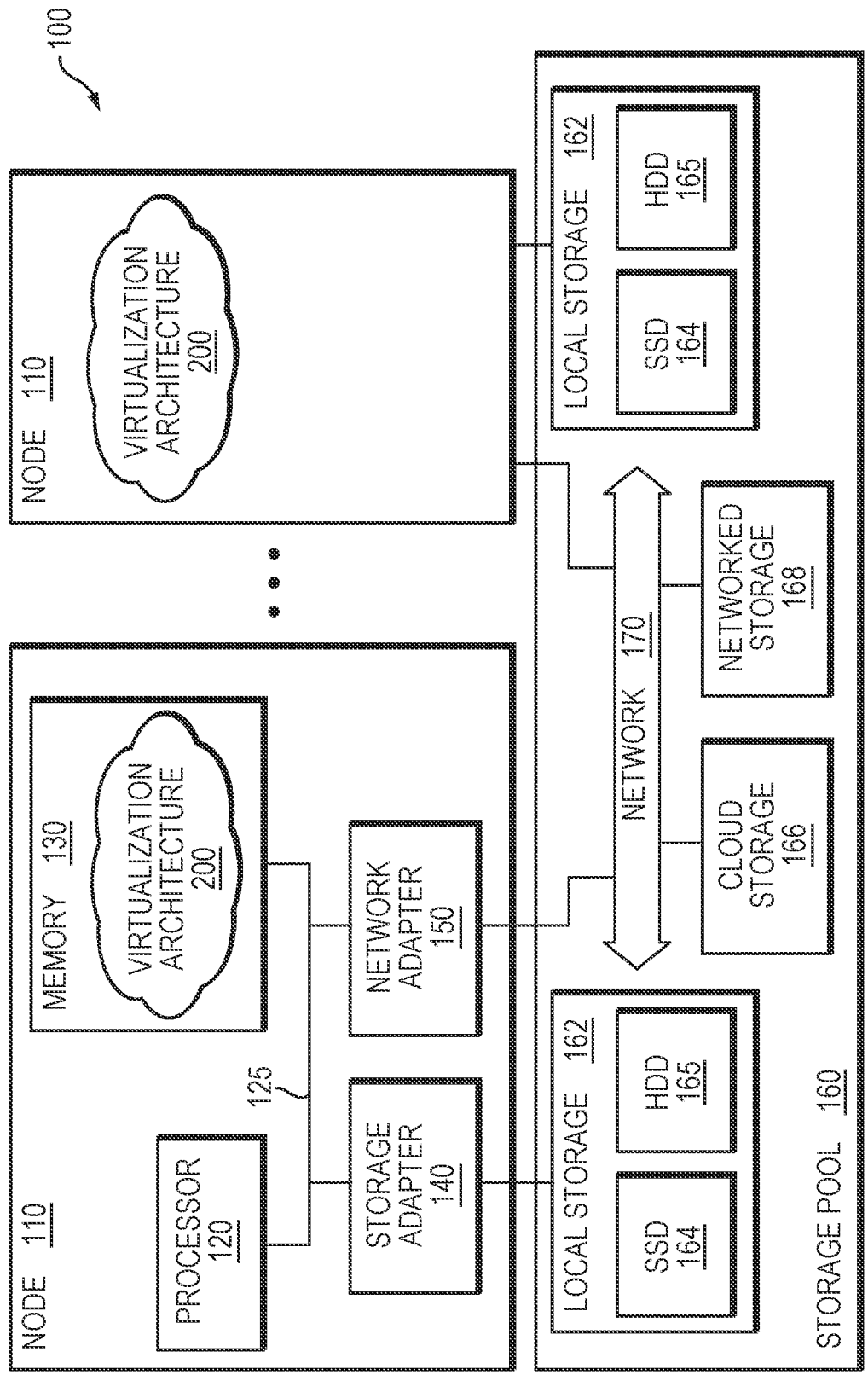
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the cluster 100 and a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be effected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
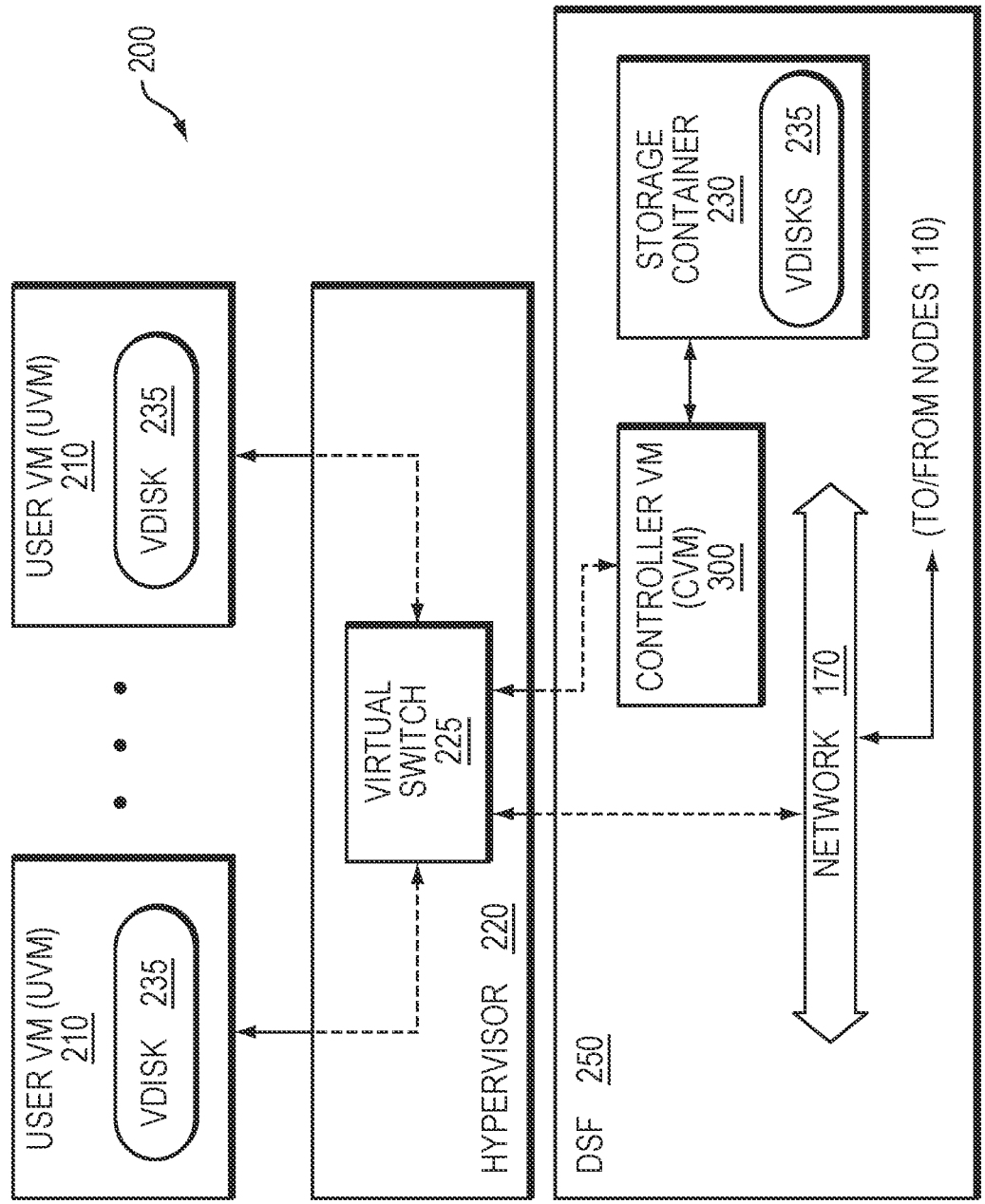
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI, CIPS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to one or more storage devices via a CVM 300 on the same or different node 110. The UVM 210 may issue the I/O accesses as a SCSI protocol request to the storage devices (e.g., a backing store). Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly, interpret and process that request. Notably the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
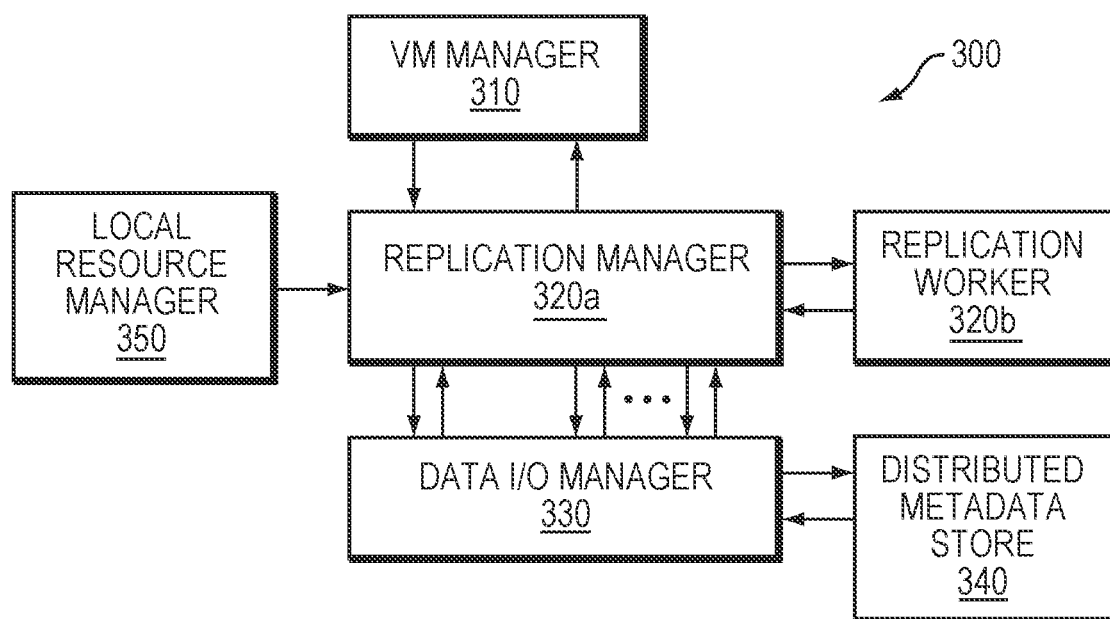
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack that may be decomposed into a plurality of threads running in a user space of the operating system of the CVM to provide storage and I/O management services within DSF 250. In an embodiment, the user mode processes include a Virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A local resource manager 350 allows users (administrators) to monitor and manage resources of the cluster. A replication manager 320a is configured to provide replication and disaster recovery services of DSF 250 and, to that end, cooperates with the local resource manager 350 to implement the services, such as migration/failover of virtual machines and containers, as well as scheduling of snapshots. In an embodiment, the replication manager 320a may also interact with one or more replication workers 320b. A data I/O manager 330 is responsible for all data management and I/O operations in DSF 250 and provides a main interface to/from the hypervisor 220, e.g., via the 1P-based storage protocols. Illustratively, the data I/O manager 330 presents a vdisk 235 to the UVM 210 in order to service 110 access requests by the UVM to the DFS. A distributed metadata store 340 stores and manages all metadata in the node/cluster, including metadata structures that store metadata used to locate (map) the actual content of vdisks on the storage devices of the cluster.

Data failover generally involves copying or replicating data among one or more nodes 110 of clusters 100 embodied as, e.g., datacenters to enable continued operation of data processing operations in a multi-site data replication environment, such as disaster recovery (DR). The multi-site DR environment may include two or more datacenters, i.e., sites, which are typically geographically separated by relatively large distances and connected over a communication network, such as a WAN. For example, data at a local datacenter (primary site) may be replicated over the network to one or more remote datacenters (secondary and/or tertiary sites) located at geographically separated distances to ensure continuity of data processing operations in the event of a failure of the nodes at the primary site.

Synchronous replication may be used to replicate the data between the sites such that each update to the data at the primary site is copied to the secondary and tertiary sites. For instance, every update (e.g., write operation) issued by a UVM 210 to data designated for failover (i.e., failover data) is continuously replicated from the primary site to the secondary site before the write operation is acknowledged to the UVM. Thus, if the primary site fails, the secondary site has an exact (i.e., mirror copy) of the failover data at all times. Synchronous replication generally does not require the use of snapshots of the data; however, to establish a multi-site DR environment or to facilitate recovery from, e.g., network outages in such an environment, a snapshot may be employed to establish a point-in-time reference from which the sites can (re)synchronize the failover data.

In the absence of continuous synchronous replication between the sites, the current state of the failover data at the secondary site always "lags behind" (is not synchronized with) that of the primary site, resulting in possible data loss in the event of a failure of the primary site. If a specified amount of time lag in synchronization is tolerable, then asynchronous (incremental) replication may be selected between the sites, for example, a point-in-time image replication from the primary site to the secondary site does not lag (behind) more than the specified time. Incremental replication generally involves at least two point-in-time images or snapshots of the data to be replicated, e.g., a base snapshot that is used as a reference and a current snapshot that is used to identify incremental changes to the data since the base snapshot. To facilitate efficient incremental replication in a multi-site DR environment, a base snapshot is required at each site. Note that the data may include an entire state of a virtual machine including associated storage objects.

Figure 4:
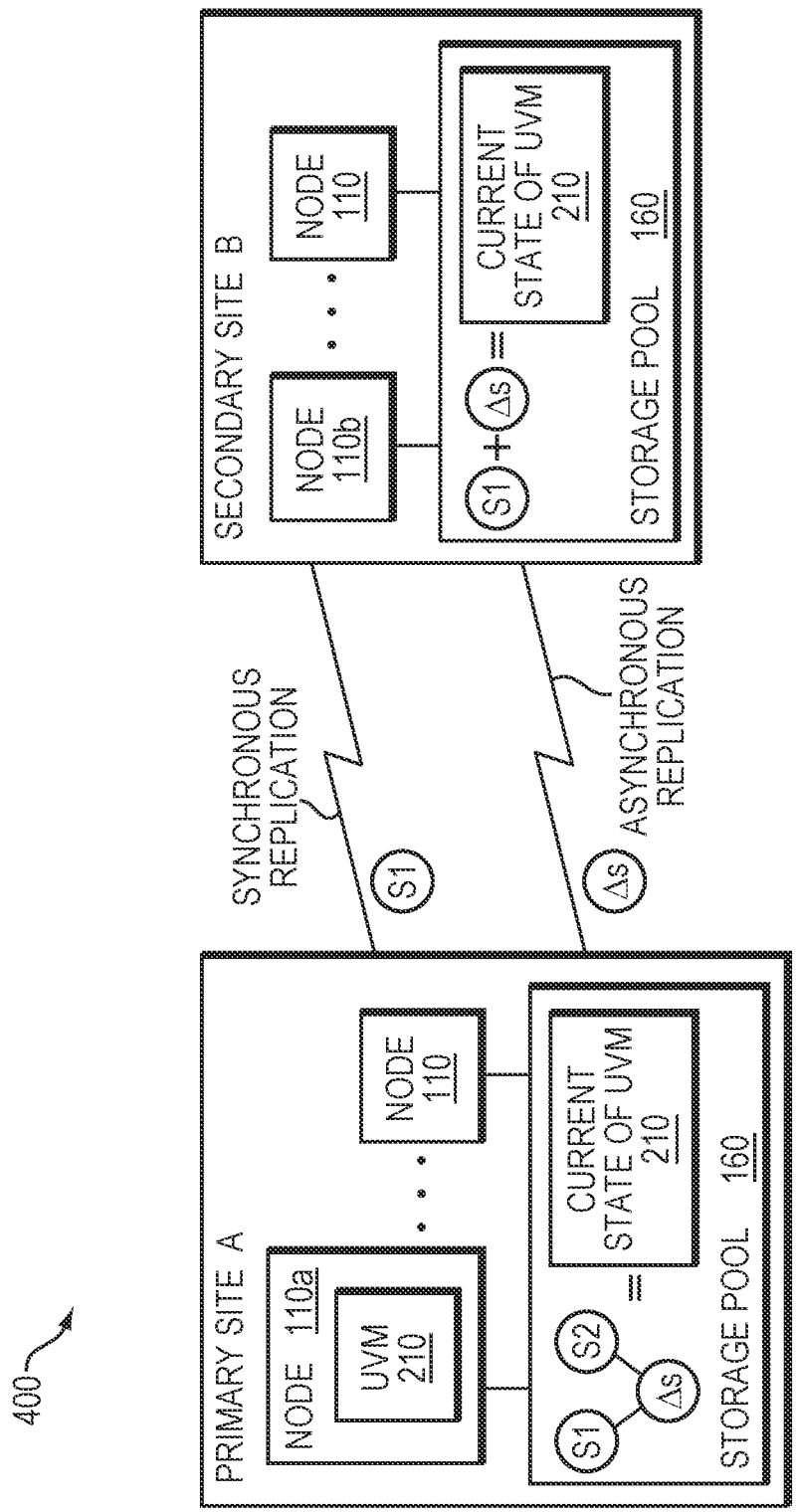
FIG. 4 is a block diagram of an exemplary multi-site data replication environment configured for use in various deployments such as for disaster recovery (DR)

FIG. 4 is a block diagram of an exemplary multi-site data replication environment 400 configured for use in various deployments, such as for disaster recovery (DR). Illustratively, the multi-site environment 400 includes two sites: primary site A and secondary site B, wherein each site represents a datacenter embodied as a cluster 100 having one or more nodes 110. A category of data (e.g., one or more UVMs 210) running on primary node 110a at primary site A is designated for failover to secondary site B (e.g., secondary node 110b) in the event of failure of primary site A. A first snapshot S1 of the data is generated at the primary site A and replicated (e.g., via synchronous replication) to secondary site B as a base or "common" snapshot S1. A period of time later, a second snapshot S2 may be generated at primary site A to reflect a current state of the data (e.g., UVM 210). Since the common snapshot S1 exists at sites A and B, incremental changes of the second snapshots S2 are computed with respect to the reference snapshot. Only the incremental changes (deltas Δs) to the data designated for failover need be sent (e.g., via asynchronous replication) to site B, which applies the deltas (Δs) to S1 so as to synchronize the state of the UVM 210 to the time of the snapshot S2 at the primary site. A tolerance of how long before data loss will exceed what is acceptable determines (i.e., imposes) a frequency of snapshots and replication of deltas to failover sites.

The snapshots of the UVM 210 include data of the snapshot (e.g., a vdisk 235 exported to the UVM 210) and snapshot metadata, which is essentially configuration information describing the UVM in terms of, e.g., virtual processor, memory, network and storage device resources of the UVM 210. The snapshot data and metadata may be used to manage many current and future operations involving the snapshot. However, not all snapshots and snapshot metadata may be needed for all snapshot operations. Yet, all of the snapshot metadata associated with each snapshot is typically maintained in memory of a node even if some of the snapshots and metadata are infrequently used. Maintenance of infrequently used snapshots and snapshot metadata increases the consumption of memory (i.e., memory footprint).

The embodiments described herein are directed to a technique for creating a compact state of snapshot metadata and associated selected snapshots that are frequently used (or expected to be frequently used) and thus maintained in memory (in-core) of a node of a cluster to facilitate processing of workflow operations associated with a logical entity, such as a virtual machine, in a disaster recovery (DR) environment. The compact state represents a reduced (e.g., minimal) subset of snapshot metadata in accordance with actual or expected performance of operations, such as frequently used DR workflow operations, e.g., periodic scans of selected snapshot data (e.g., vdisk 235). In addition, metadata associated with the progress of the DR workflow operations (e.g., multi-step operations) processed by the node is periodically consolidated within the compact state. In essence, snapshot metadata is filtered (i.e., reduced) to an amount sufficient to perform the DR workflow operations on selected snapshots and is maintained in-core with the remaining snapshot data and metadata accessible via on-demand paging from the storage devices of the backing store. Memory may be dynamically allocated for any additional paged data/metadata needed to perform additional DR operations. Once the operations are completed, the additional data/metadata may be evicted from memory to the backing store and the dynamically allocated memory released. Note that filtering may be configured to maintain a critical subset of snapshots (i.e., a least number sufficient to support DR operations) and snapshot metadata in-core.

Figure 5:
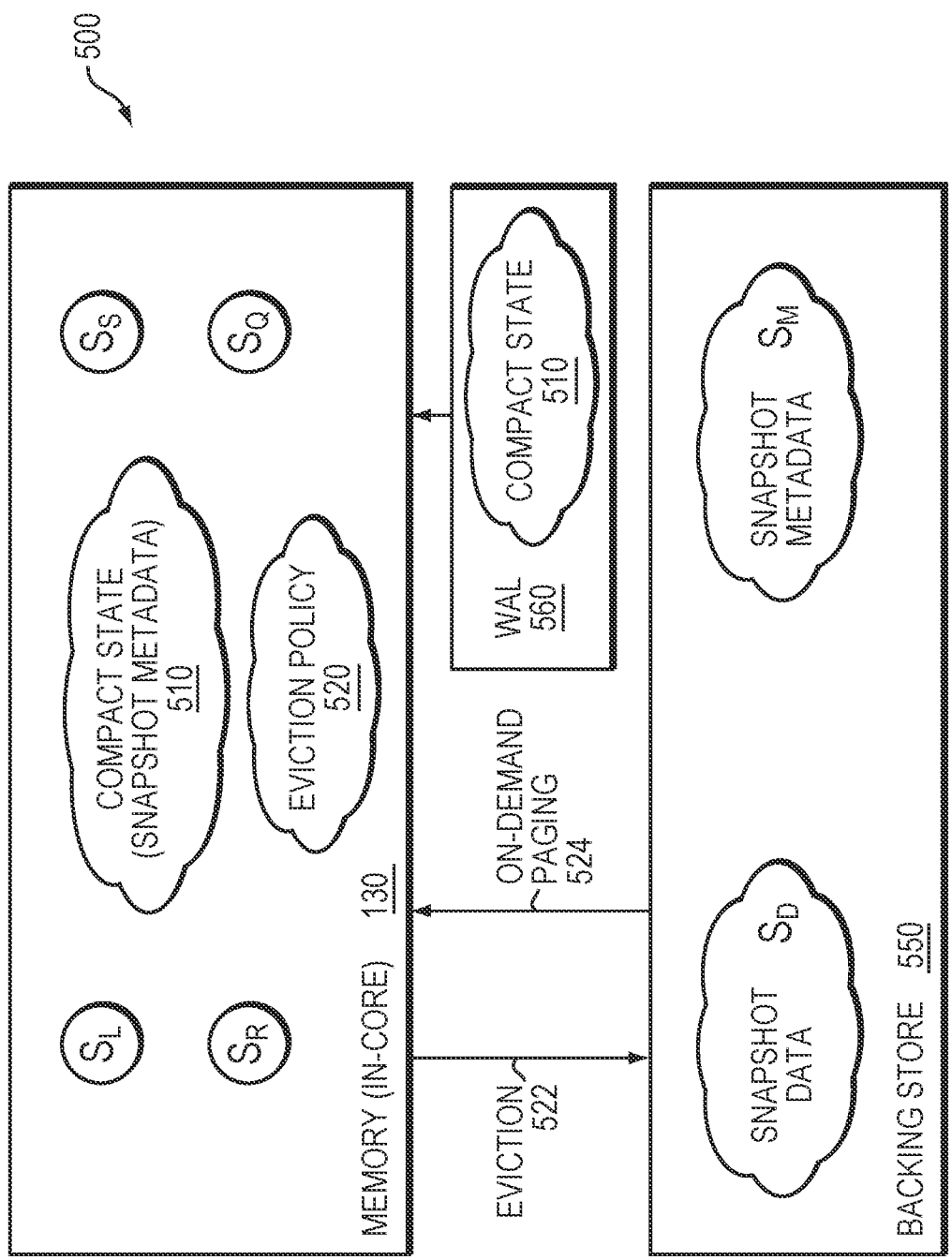
FIG. 5 is a block diagram illustrating a technique for creating a compact state of snapshots and associated metadata that is maintained in memory of a node of the cluster to facilitate processing of workflow operations in a DR environment.

FIG. 5 is a block diagram illustrating a technique for creating a compact state of snapshots and associated metadata that is frequently used and thus maintained in memory of a node of a cluster to facilitate processing of workflow operations in a DR environment. Certain (selected) snapshots and associated metadata may be used to manage many current and future operations that involve the snapshots, particularly for DR workflow operations that involve regular repetitive use of snapshots. According to the technique 500, these selected snapshots and snapshot metadata are represented and retained in memory 130 as a compact state 510 of snapshot metadata and associated selected snapshots so as to avoid having to retrieve that information from a backing store 550 (e.g., SSD and/or HDD) when required by the DR workflow operations. Illustratively, the selected, frequently-used snapshots of the logical entity (usually associated with DR of the logical entity) include (i) a recently created (latest) snapshot (denoted $S_L$), which avoids having to page-in its full snapshot state in the context of a DR operation (such as migration) that operates on the latest snapshot; (ii) one or more reference snapshots (denoted $S_R$), which avoids having to page-in the full state of each reference snapshot for a (delta) replication operation; (iii) a snapshot scheduled for replication (denoted $S_S$); and (iv) any snapshot that is queued for a current or future-scheduled operation (denoted $S_Q$).

In addition, the compact state 510 of the snapshot metadata include attributes (fields) such as, e.g., (i) frequently referenced timestamps, which are useful in time-ordered scans such as garbage collection, latest snapshot checks, and reference calculations; (ii) fields required to publish periodic stats, such as vdisk IDs; and (iii) frequently referenced properties of snapshots, such as an application consistent bit that facilitates identification of application consistent snapshots in backup workflows. In-core retention of the compact state 510 of the snapshot metadata together with the selected snapshots (hereinafter generally S) enables performance of periodic and background DR workflow operations or tasks without requiring retrieval of the information from the backing store 550.

The technique 500 is also directed to a snapshot and metadata management process embodied as an eviction policy 520 that is configured to evict (eviction 522) infrequently used snapshots and snapshot metadata (e.g., embodied as a compact state) to improve memory space consumption of the memory 130 (i.e., the memory footprint). Eviction rules of the eviction policy 520 are applied to the snapshots of the UVM 210 to ensure that the selected snapshots S are not evicted from (i.e., are retained in) memory 130. For example, assume a snapshot is generated that is replicated via a plurality of snapshot replication operations to multiple sites in the multi-site replication DR environment 400. The reference snapshot $S_R$ for each site may be different and is needed for incremental change (delta) computations for each replication operation. Since the replication operations to the sites are imminent, the rules of the eviction policy 520 ensure that the selected snapshots S are not evicted from memory. In essence, the eviction policy retains snapshots essential for expected near-term use (e.g., based on a time threshold such as 120 mins) and for DR operations (e.g., snapshot replication and retention to other sites).

In an embodiment, metadata of the selected snapshots S are retained in-core (rather than evicted) based on (identified by) their status in a DR workflow hierarchy as represented by a DR state. As used herein, the "DR state" is embodied as meta-information that indicates the current or future progress of DR operations, as well as the snapshots needed to process those operations, wherein "status" is defined by the eviction rules and their reference to the current or future DR operations. Thus, instead of tagging, a snapshot is characterized for eviction/retention based on an analysis of the DR state at a particular point in time, as well as the status of the snapshot in the DR workflow hierarchy.

However, some operations, such as a restore or replication operation, may require full snapshot data and metadata associated with the selected snapshots S. To that end, the technique 500 dynamically detects whether the evicted snapshots/metadata are needed to perform additional operations for the DR workflow and, if so, retrieves (via on-demand paging 524) additional snapshot data (denoted $S_D$) and snapshot metadata (denoted $S_M$) from the backing store 550 as needed. Unlike traditional cache eviction policies based on time and use (e.g., time in-cache or frequency of use) or access thresholds (such as least recently used), the snapshot and metadata eviction policy 520 is configured for DR workflows and associated operation processing. That is, actual and expected DR workflow use memory paging of snapshot data and metadata. In other words, a lifecycle of the compact state 510 of snapshot metadata and associated selected snapshots S is in accordance with (i.e., configured for) DR workflow operations and, since all necessary snapshots and snapshot metadata are maintained in-core, there is no impact to performance of those operations.

In an embodiment, the technique 500 may be extended to accommodate additional fields that may be fetched from the backing store 550 in accordance with a dynamic retention feature of the eviction policy 520 that adapts the metadata content of the compact state 510 for additional, new DR workflows. For example, dynamic retention logic of the eviction policy 520 may detect a pattern of more frequent use of the fetched fields and, in response, dynamically add those fields to the compact state 510 of snapshot metadata for retention in-core. Note that conventional caching typically fetches an entire record from a backing store 550 irrespective of the fields actually needed. That is, a conventional cache usually transacts (i.e., loads and stores) based on fixed line or entry sizes in an address space and is application independent. In contrast, the dynamic retention feature of the snapshot and metadata eviction policy 520 is configured to fetch only fields (i.e., a subset) of the records needed for DR workflow processing. As such, the dynamic retention feature is application aware (e.g., DR workflow processing) and predictive of application object use, i.e., the dynamic retention logic is configured to predict whether certain fields of a compact state for a snapshot is needed by a DR workflow operation and, if so, include those fields within the compact state retained in memory. Notably, fields that become unused or no longer required (i.e., no dependency for future DR workflows) may be removed from the snapshot metadata.

In an embodiment, the compact state 510 is stored in a write-ahead log (WAL) 560 that preferably resides in a fast storage media tier, such as SSD. In the event of a cluster or node failure, the consolidated metadata of the compact state 510 may be loaded substantially fast in memory 130 during reboot (initialization) of the node 110. The WAL 560 is illustratively a log-type data structure (log-structured) wherein the progress state is appended to the end of the log as records. Checkpoints may be created by coalescing the appended records into smaller, compact persistent records. During recovery of a failed node, the latest state of the DR workflow may be quickly recreated by retrieving the last checkpoint of the WAL 560 and applying any other appended records not yet captured in the latest checkpoint.

Advantageously, maintenance of the compact state of snapshot metadata and associated selected snapshots that are frequently used (or expected to be frequently used) in memory of a node of a cluster facilitates processing of workflow operations associated with a logical entity in a DR environment, while reducing the consumption of memory (e.g., the memory footprint). The compact state of the technique also provides rapid recovery from node failure as the snapshot metadata is reduced to a subset sufficient to provide for recovery without needless examination of excessive data and metadata.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or compact disks) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
scheduling creation of a first snapshot to support application operations processed by a node;
retaining a first compact state for the first snapshot in a memory of the node based on a predicted use of one or more fields of metadata of the first snapshot by a first application operation, wherein the one or more fields of the first compact state represent a filtered subset of metadata including frequently referenced attributes of the first snapshot, wherein the filtered subset of metadata is retrieved from a backing store based on frequency of use of the referenced attributes to demand-page the metadata from the backing store to reduce memory consumption;
completing the first application operation using the first compact state; and
in response to predicting that the first compact state is not needed by a future application operation, evicting the first compact state from the memory.

2. The method of claim 1 further comprising:
predicting whether an additional field of metadata of a second snapshot is needed by a second application operation; and
in response to predicting that the additional field of metadata of the second snapshot is needed by the second application operation, retaining a second compact state in the memory by demand-paging the one or more fields and an additional field of metadata of the second snapshot from the backing store into the second compact state.

3. The method of claim 1 wherein in response to the prediction that at least one of the one or more fields of metadata are unused, removing the at least one of the one or more fields from the first snapshot in the memory.

4. The method of claim 2 further comprising in response to determining that the additional field of metadata of the second snapshot is not needed for the future operation, removing the additional field from the second compact state to further reduce the memory consumption.

5. The method of claim 2 wherein the first snapshot is a reference snapshot and wherein the second snapshot represents an incremental change from the first snapshot.

6. The method of claim 1 further comprising demand paging additional snapshot metadata into the memory needed to complete the first application operation.

7. The method of claim 1 further comprising, in response to failure of the node, performing one or more recovery operations using the first compact state of the first snapshot, wherein the snapshot metadata of the first compact state is needed to recover point-in-time information of the first snapshot.

8. The method of claim 1 wherein the one or more fields of metadata is retained in memory based on a status in a disaster recovery (DR) workflow hierarchy as represented by a DR state.

9. The method of claim 8 wherein the DR state comprises meta-information that indicates current or future progress of DR workflow operations, as well as the snapshots needed to process those operations.

10. The method of claim 8 wherein the status is defined by eviction rules and their reference to current or future application operations.

11. A non-transitory computer readable medium including program instructions for execution on a processor of a node, the program instructions configured to:
    schedule creation of a first snapshot to support application operations processed by the node;
    retain a first compact state for the first snapshot in a memory of the node based on a predicted use of one or more fields of metadata of the first snapshot by a first application operation, wherein the one or more fields of the first compact state represent a filtered subset of metadata including frequently referenced attributes of the first snapshot, wherein the filtered subset of metadata is retrieved from a backing store based on frequency of use of the referenced attributes to demand-page the metadata from the backing store to reduce memory consumption;
    complete the first application operation using the first compact state; and
    in response to predicting that the first compact state is not needed by a future application operation, evict the first compact state from the memory.

12. The non-transitory computer readable medium of claim 11, wherein the program instructions are further configured to:
    predict whether an additional field of metadata of a second snapshot is needed by a second application operation; and
    in response to predicting that the additional field of metadata of the second snapshot is needed by the second application operation, retain a second compact state in the memory by demand-paging the one or more fields and an additional field of metadata of the second snapshot from the backing store into the second compact state.

13. The non-transitory computer readable medium of claim 11, wherein the program instructions are further configured to in response to the prediction that at least one of the one or more fields of metadata are unused, removing the at least one of the one or more fields from the first snapshot in the memory.

14. The non-transitory computer readable medium of claim 12, wherein the program instructions are further configured to in response to determining that the additional field of metadata of the second snapshot is not needed for the future operation, remove the additional field from the second compact state to further reduce the memory consumption.

15. The non-transitory computer readable medium of claim 12, wherein the first snapshot is a reference snapshot and wherein the second snapshot represents an incremental change from the first snapshot.

16. The non-transitory computer readable medium of claim 11, wherein the program instructions are further configured to demand page additional snapshot metadata into the memory needed to complete the first application operation.

17. The non-transitory computer readable medium of claim 11, wherein the program instructions are further configured to, in response to failure of the node, perform one or more recovery operations using the first compact state of the first snapshot, wherein the snapshot metadata of the first compact state is needed to recover point-in-time information of the first snapshot.

18. The non-transitory computer readable medium of claim 11, wherein the program instructions are further configured to retain the one or more fields of metadata in memory based on a status in a disaster recovery (DR) workflow hierarchy as represented by a DR state.

19. The non-transitory computer readable medium of claim 12, wherein the program instructions are further configured to store the compact states in a write-ahead log data structure configured to, in response to failure of the node, facilitate loading of the filtered subsets of metadata substantially fast in the memory during reboot of the node.

20. An apparatus comprising:
    a node having a memory and a processor configured to execute program instructions to:
        schedule creation of a first snapshot to support application operations processed by the node;
        retain a first compact state for the first snapshot in the memory based on a predicted use of one or more fields of metadata of the first snapshot by a first application operation, wherein the one or more fields of the first compact state represent a filtered subset of metadata including frequently referenced attributes of the first snapshot, wherein the filtered subset of metadata is retrieved from a backing store based on frequency of use of the referenced attributes to demand-page the metadata from the backing store to reduce memory consumption;
        complete the first application operation using the first compact state; and
        in response to predicting that the first compact state is not needed by a future application operation, evict the first compact state from the memory.

21. The apparatus of claim 20, wherein the program instructions further include program instructions to:
    predict whether an additional field of metadata of a second snapshot is needed by a second application operation; and
    in response to predicting that the additional field of metadata of the second snapshot is needed by the second application operation, retain a second compact state in the memory by demand-paging the one or more fields and an additional field of metadata of the second snapshot from the backing store into the second compact state.

22. The apparatus of claim 20, wherein the program instructions further include program instructions to in response to the prediction that at least one of the one or more fields of metadata are unused, remove the at least one of the one or more fields from the first snapshot in the memory.

23. The apparatus of claim 21, wherein the program instructions further include program instructions to, in response to determining that the additional fields of metadata of the second snapshot is not needed for the future operation, remove the additional field from the second compact state to further reduce the memory consumption.

24. The apparatus of claim 21, wherein the first snapshot is a reference snapshot and wherein the second snapshot represents an incremental change from the first snapshot.

25. The apparatus of claim 20, wherein the program instructions further include program instructions to demand page additional snapshot metadata into the memory needed to complete the first application operation.

26. The apparatus of claim 20, wherein the program instructions further include program instructions to, in response to failure of the node, perform one or more recovery operations using the first compact state of the first snapshot, wherein the snapshot metadata of the first compact state is needed to recover point-in-time information of the first snapshot.

27. The apparatus of claim 20, wherein the program instructions further include program instructions to retain the one or more fields of metadata in memory based on a status in a disaster recovery (DR) workflow hierarchy as represented by a DR state.

28. The apparatus of claim 27 wherein the DR state comprises meta-information that indicates current or future progress of DR workflow operations, as well as the snapshots needed to process those operations.

29. The apparatus of claim 27 wherein the status is defined by eviction rules and their reference to current or future application operations.

30. The apparatus of claim 21, wherein the program instructions further include program instructions to store the compact states in a write-ahead log data structure configured to, in response to failure of the node, facilitate loading of the filtered subsets of metadata substantially fast in the memory during reboot of the node.

\* \* \* \* \*